(12) United States Patent
Delarue et al.

(10) Patent No.: US 9,411,828 B2
(45) Date of Patent: Aug. 9, 2016

(54) METHOD AND SYSTEM FOR NAVIGATING IN A DATABASE OF A COMPUTER SYSTEM

(75) Inventors: Guillaume Delarue, Courbevoie (FR); Duy Minh Vu, Paris (FR); Guénolé Ginquel, Courbevoie (FR)

(73) Assignee: Dassault Systemes, Velizy Villacoublay (FR)

( * ) Notice: Subject to any disclaimer, the term of this patent is extended or adjusted under 35 U.S.C. 154(b) by 1497 days.

(21) Appl. No.: 11/828,691

(22) Filed: Jul. 26, 2007

(65) Prior Publication Data

US 2008/0098311 A1    Apr. 24, 2008

(30) Foreign Application Priority Data

Jul. 28, 2006  (EP) .................................... 06015755

(51) Int. Cl.
| | |
|---|---|
| *G06F 17/30* | (2006.01) |
| *G06Q 10/08* | (2012.01) |
| *G06Q 30/06* | (2012.01) |
| *G06T 11/20* | (2006.01) |
| *G02B 21/36* | (2006.01) |

(52) U.S. Cl.
CPC ........ *G06F 17/30274* (2013.01); *G02B 21/367* (2013.01); *G06Q 10/087* (2013.01); *G06Q 10/0875* (2013.01); *G06Q 30/0641* (2013.01); *G06Q 30/0643* (2013.01); *G06T 11/206* (2013.01); *G09G 2370/027* (2013.01)

(58) Field of Classification Search
CPC ................... G06F 17/30274; G09G 2370/027; G02B 21/367
USPC ................................................. 715/853, 829
See application file for complete search history.

(56) References Cited

U.S. PATENT DOCUMENTS

| | | | | |
|---|---|---|---|---|
| 4,751,507 A | * | 6/1988 | Hama ..................... | G09G 5/391 345/661 |
| 5,265,014 A | * | 11/1993 | Haddock ........... | G06F 17/30398 704/9 |
| 5,305,435 A | * | 4/1994 | Bronson ............... | G09F 3/0481 715/775 |
| 5,440,348 A | * | 8/1995 | Peters .................. | G11B 27/034 348/588 |
| 5,682,489 A | * | 10/1997 | Harrow et al. ................. | 715/839 |

(Continued)

FOREIGN PATENT DOCUMENTS

| | | | |
|---|---|---|---|
| CA | 2247030 A1 | * | 3/2000 |
| EP | 1 883 020 A1 | | 1/2008 |

(Continued)

OTHER PUBLICATIONS

Bing search q=3%20dimensional%20product%20query& Apr. 14, 2016.*

(Continued)

*Primary Examiner* — Matthew Ell
*Assistant Examiner* — John M Heffington
(74) *Attorney, Agent, or Firm* — Hamilton, Brook, Smith & Reynolds, P.C.

(57) ABSTRACT

The invention is directed to a computer program, a computer system and a method for navigating in a database of a subject system. The subject system comprises a graphical user interface. The invention method comprising steps of (i) returning results (110*a-g*) from a query in the database, and (ii) displaying in the graphical user interface (100) the results returned using several levels of progressive granularity. Each of the results is associated with one of the levels of granularity, according to the query.

19 Claims, 12 Drawing Sheets

(56) References Cited

U.S. PATENT DOCUMENTS

| | | | | |
|---|---|---|---|---|
| 5,771,280 A * | 6/1998 | Johnson | | 379/93.23 |
| 5,790,819 A * | 8/1998 | Rosenburg | | G06T 3/40 345/160 |
| 5,835,091 A * | 11/1998 | Bailey et al. | | 715/854 |
| 5,844,795 A * | 12/1998 | Johnston et al. | | 700/83 |
| 5,874,961 A * | 2/1999 | Bates et al. | | 715/786 |
| 6,121,969 A * | 9/2000 | Jain | | G06F 3/04815 382/305 |
| 6,141,699 A * | 10/2000 | Luzzi | | G06F 11/3495 707/999.01 |
| 6,243,093 B1 * | 6/2001 | Czerwinski | | G06F 3/04815 707/E17.142 |
| 6,345,272 B1 * | 2/2002 | Witkowski | | G06F 17/30457 706/16 |
| 6,351,765 B1 * | 2/2002 | Pietropaolo | | G11B 27/034 348/722 |
| 6,400,366 B1 * | 6/2002 | Davies et al. | | 345/440 |
| 6,480,836 B1 * | 11/2002 | Colby | | G06F 17/30312 707/717 |
| 6,480,843 B2 * | 11/2002 | Li | | G06F 17/30622 |
| 6,535,888 B1 * | 3/2003 | Vijayan | | G06F 17/30905 707/706 |
| 6,567,812 B1 * | 5/2003 | Garrecht et al. | | 707/708 |
| 6,571,249 B1 * | 5/2003 | Garrecht et al. | | |
| 6,594,653 B2 * | 7/2003 | Colby | | G06F 17/30312 |
| 6,636,853 B1 | 10/2003 | Stephens, Jr. | | |
| 6,661,437 B1 * | 12/2003 | Miller et al. | | 715/810 |
| 7,191,411 B2 * | 3/2007 | Moehrle | | 715/855 |
| 7,310,652 B1 * | 12/2007 | Zaifman | | G06F 17/30457 |
| 7,373,612 B2 * | 5/2008 | Risch et al. | | 715/850 |
| 7,380,216 B2 * | 5/2008 | Feig | | G06F 3/03847 715/786 |
| 7,386,801 B1 * | 6/2008 | Horvitz | | G06F 3/0481 715/764 |
| 7,418,670 B2 * | 8/2008 | Goldsmith | | 715/810 |
| 7,425,963 B2 * | 9/2008 | Gargi | | G06F 17/30973 345/589 |
| 7,426,696 B1 * | 9/2008 | Hwang et al. | | 715/784 |
| 7,461,077 B1 * | 12/2008 | Greenwood | | G06F 3/0482 |
| 7,486,274 B2 * | 2/2009 | Forlines | | G06F 3/0325 345/157 |
| 7,711,813 B1 * | 5/2010 | Yehuda | | G06F 3/0604 709/224 |
| 7,716,586 B2 * | 5/2010 | Dieberger et al. | | 715/734 |
| 7,735,018 B2 * | 6/2010 | Bakhash | | 715/782 |
| 7,802,203 B2 * | 9/2010 | Danninger | | 715/841 |
| 7,827,499 B2 * | 11/2010 | Hao et al. | | 715/764 |
| 7,840,564 B2 * | 11/2010 | Holzgrafe | | G06F 17/30011 707/602 |
| 8,127,229 B2 * | 2/2012 | Inoguchi et al. | | 715/273 |
| 8,640,050 B2 * | 1/2014 | Querre | | 715/829 |
| 8,775,330 B2 * | 7/2014 | Dettinger | | G06Q 30/0283 705/400 |
| 2001/0050687 A1 * | 12/2001 | Iida | | G06T 11/206 345/581 |
| 2002/0063737 A1 * | 5/2002 | Feig | | G06F 3/04847 715/786 |
| 2002/0069137 A1 * | 6/2002 | Hiroshige | | G06Q 10/08 705/308 |
| 2002/0078019 A1 * | 6/2002 | Lawton | | G06F 17/30864 |
| 2002/0078022 A1 * | 6/2002 | Lawton | | G06F 17/30864 |
| 2002/0105532 A1 * | 8/2002 | Oblinger | | G06F 17/30997 715/701 |
| 2002/0107842 A1 * | 8/2002 | Biebesheimer | | G06F 17/30864 |
| 2002/0152222 A1 | 10/2002 | Holbrook | | |
| 2002/0184111 A1 * | 12/2002 | Swanson | | 705/26 |
| 2003/0088663 A1 * | 5/2003 | Battat et al. | | 709/224 |
| 2003/0093437 A1 * | 5/2003 | Gargi | | G06F 17/30973 |
| 2003/0156124 A1 * | 8/2003 | Good | | G06F 17/27 345/620 |
| 2004/0030741 A1 * | 2/2004 | Wolton | | G06F 17/30873 709/202 |
| 2004/0083206 A1 * | 4/2004 | Wu et al. | | 707/3 |
| 2004/0090472 A1 * | 5/2004 | Risch | | G06F 17/30716 715/853 |
| 2004/0103090 A1 * | 5/2004 | Dogl et al. | | 707/3 |
| 2004/0150668 A1 * | 8/2004 | Myers et al. | | 345/771 |
| 2004/0168107 A1 * | 8/2004 | Sharp et al. | | 714/33 |
| 2004/0243662 A1 * | 12/2004 | Mastro | | 709/200 |
| 2005/0018707 A1 * | 1/2005 | Subramanian et al. | | 370/458 |
| 2005/0076309 A1 * | 4/2005 | Goldsmith | | 715/811 |
| 2005/0076312 A1 * | 4/2005 | Gardner et al. | | 715/853 |
| 2005/0086611 A1 * | 4/2005 | Takabe et al. | | 715/823 |
| 2005/0111746 A1 * | 5/2005 | Kumar | | H04N 19/132 382/248 |
| 2005/0126371 A1 * | 6/2005 | Kodama | | G06F 17/30743 84/636 |
| 2005/0222901 A1 * | 10/2005 | Agarwal | | G06F 17/3061 705/14.54 |
| 2005/0268253 A1 * | 12/2005 | Johnson | | G06F 3/0482 715/841 |
| 2006/0026636 A1 * | 2/2006 | Stark | | H04N 4/44543 725/37 |
| 2006/0026638 A1 * | 2/2006 | Stark | | G06F 17/30861 725/38 |
| 2006/0092770 A1 * | 5/2006 | Demas | | G04B 19/22 368/223 |
| 2006/0095858 A1 * | 5/2006 | Hao et al. | | 715/764 |
| 2006/0167864 A1 * | 7/2006 | Bailey et al. | | 707/3 |
| 2006/0195431 A1 * | 8/2006 | Holzgrafe | | G06F 17/30011 |
| 2006/0224996 A1 * | 10/2006 | Rummler | | 715/818 |
| 2006/0265315 A1 * | 11/2006 | Friesen et al. | | 705/37 |
| 2007/0157090 A1 * | 7/2007 | Haug | | G06F 3/0481 715/703 |
| 2007/0174790 A1 * | 7/2007 | Jing | | G06F 17/30274 715/838 |
| 2007/0192695 A1 * | 8/2007 | Grotjohn et al. | | 715/713 |
| 2007/0214169 A1 * | 9/2007 | Audet et al. | | 707/102 |
| 2008/0097762 A1 * | 4/2008 | Kunz | | G06F 17/243 704/276 |
| 2008/0276201 A1 * | 11/2008 | Risch et al. | | 715/853 |
| 2009/0204938 A1 * | 8/2009 | Schindler | | G06F 8/10 717/105 |

FOREIGN PATENT DOCUMENTS

| | | |
|---|---|---|
| JP | 2008-263248 | 10/1996 |
| JP | 2000-105772 | 4/2000 |
| JP | 2002-312402 | 10/2002 |
| JP | 2004-038699 | 2/2004 |
| JP | 2004-326189 | 11/2004 |
| JP | 2006-114014 | 4/2006 |
| JP | 2006-178991 | 7/2006 |
| WO | WO 03/098477 A1 | 11/2003 |

OTHER PUBLICATIONS

Bing search q=3%20dimensional%20product%20search Apr. 14, 2016.*

Bing search q=3%20dimensional%20query%20fine%20c Apr. 14, 2016.*

Bing search q=3%20dimensional%20search%20fine%20 Apr. 14, 2016.*

Bing search q=3d+product+search&src=IE-SearchBox Apr. 14, 2016.*

* cited by examiner

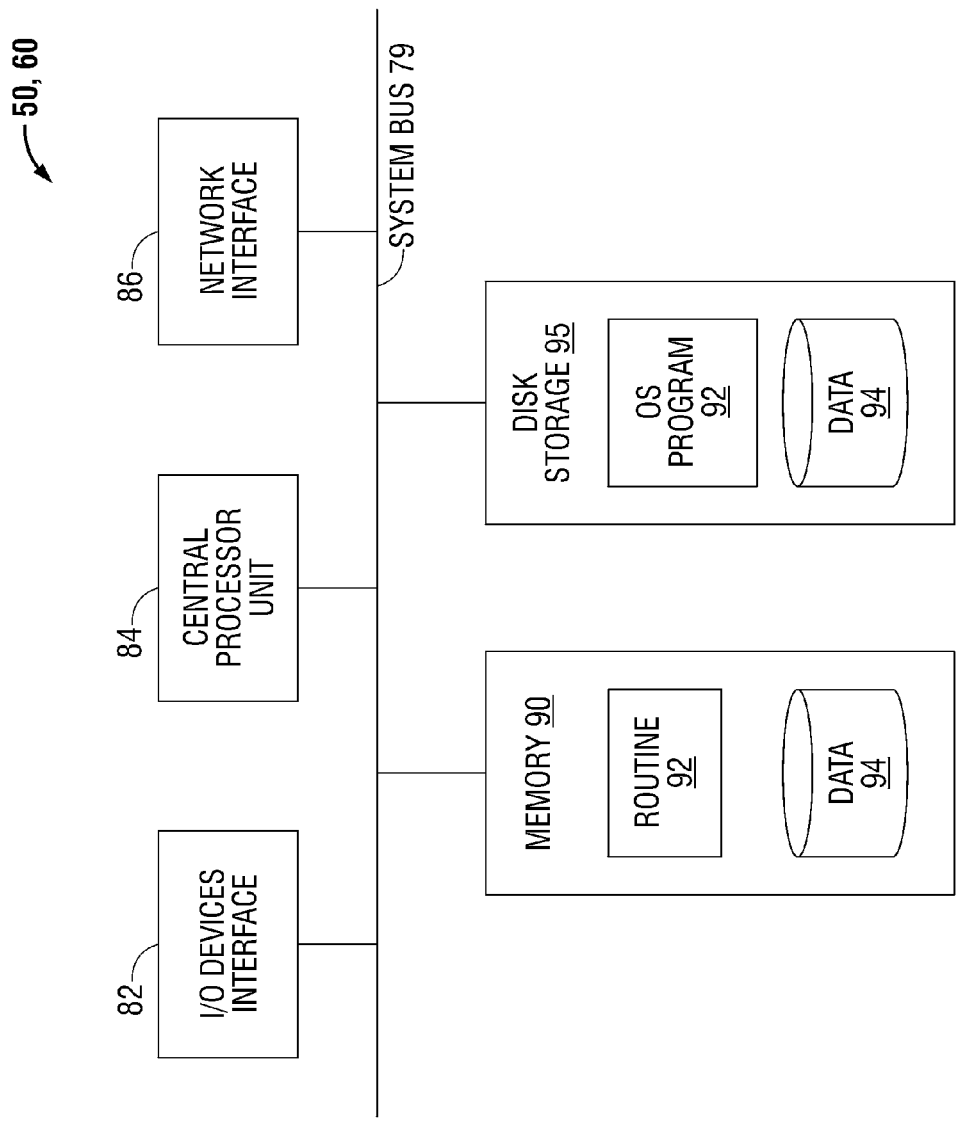

METHOD AND SYSTEM FOR NAVIGATING IN A DATABASE OF A COMPUTER SYSTEM

RELATED APPLICATION

This application claims priority under 35 U.S.C. §119 or 365 to European Patent Application No. EP 06015755.9, filed Jul. 28, 2006.

The entire teachings of the above application are incorporated herein by reference.

FIELD OF THE INVENTION

The invention relates to the field of computer programs and systems, and more specifically to product life cycle management solutions, which comprise databases of data representative of modeled objects.

BACKGROUND OF THE INVENTION

A number of systems and programs are offered on the market for the design of parts or assemblies of parts, such as the one provided by DASSAULT SYSTEMES under the trademark CATIA. These so-called computer-aided design (CAD) systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, from geometry a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of a Mega-byte for a part, and an assembly may comprise thousands of parts. A CAD system manages models of objects, which are stored in electronic files.

There also exists product life cycle management solutions (PLM), such as the one provided by DASSAULT SYSTEMES under the trademarks CATIA, ENOVIA and DELMIA; these solutions provide a Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the systems deliver an open object model linking products, processes, resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products said data being ordered in a hierarchy of data and are indexed to be searchable. The data are representative of the products, which are often modeled objects.

One of the problems in such PLM solutions is that the users of the system may wish to display results of querying, for instance concerning objects (e.g. products or product parts) stored on a database, and possibly have a 3D graphic representation of said results. Then, the user typically needs to navigate amongst the displayed results.

In a neighboring technical field, several celebrated search engines have been developed for retrieving information on the Internet. For instance, the ALTA VISTA Company proposed an Internet search site, with a request box where the user may input keywords for retrieving information. More recently, GOOGLE Inc. proposed a searching tool for searching html files or text documents (in the PDF, MICROSOFT Word or RTF formats) available through the Internet. The results are returned to the user as a list of sorted web pages, see e.g. U.S. Pat. No. 6,285,999, with a given number of result pages that a user can subsequently explore. Each result is displayed as a URL, together with an abstract of the document accessible through the URL. The abstract is an extract of sentences or part of sentences of the document. If a web page is comprised of frames, the result returned to the user may be the URL of the frame, together with an abstract of the frame. Each frame is therefore searched and handled individually by the engine.

More generally, a web search engine, such as GOOGLE and MSN search provides a way to access information content from a global index. In particular, they do provide access to information entries that are accessible from a remote computer, for example through the HTTP, FTP or NNTP protocols.

Other searching tools exist for searching and retrieving information on the Internet. In particular, aside from search engines are also known web directories, which are directories on the WWW that specialize in linking to other web sites and categorizing those links. Web directories often allow site owners to submit their site for inclusion. For example, YAHOO! is a computer services company which operates an Internet portal, a web directory and a host of other services including the e-mail services. Web directories often make use of search engine technologies. As regards more particularly the web directory, there is again provided a request box. Results of a search input to the request box are displayed in several sections. The first section displays the category matches, together with the path to the matches in the category tree, while the second section displays site matches. The third section displays web pages. GOOGLE Inc. also provides an Internet site for search among sites and categories. The results of a search contain an indication of the classification of sites and categories. Selecting the category search provides the user with a list of categories that may relate to the search; the contents of each category may later be accessed.

Still other solutions rely on multi-criteria-based queries in databases for retrieving information.

In the above cases, the results returned from a query are sorted and accessible in several sections or pages. Exploration of the results is therefore limited to a page-by-page or section-by-section process. Within a given page or section, a summary of the results may be available. However, the user has no clue about results contained within other sections or pages. The user can therefore not see how a particular result correlates to remaining results. Exploration of the results may therefore appears too strict for the user.

Thus, according to the limitations of the existing solutions shortly discussed above, there is a need for an improved solution of navigation among results returned from a query. Preferably, said solution should allow a user to easily navigate in a database of a product lifecycle management system, storing notably complex modeled objects.

SUMMARY OF THE INVENTION

In one embodiment, the invention therefore provides a method for navigating in a database of a computer system, the computer system comprising a graphical user interface, the method comprises steps of: returning results from a query in a database; and displaying in the graphical user interface the results returned using several levels of progressive granularity, each of the results being associated with one of the levels, according to the query.

In other embodiments, the method according to the invention may comprise one or more of the following features:

- the method further comprises steps of: receiving user selection of at least one of the results returned; and redisplaying the results using said several levels of granularity, wherein the selected result is associated with a level having the finest granularity;
- the method further comprises steps of: receiving a user request for modifying the number of levels of granularity; and redisplaying the results according to the modified number of levels;
- at the step of receiving the user request for modifying the number of levels of granularity, said number can be selected amongst 1 and 2;
- the graphical user interface comprises a widget or interface component adapted for triggering a modification of the number of levels;
- the results returned are sorted in an ordered sequence; and at the step of redisplaying the results, the fineness of the granularity in the levels decreases from the selected result along the ordered sequence;
- at the step of displaying, at least two groups of results are defined based on the ordered sequence and displayed, wherein one of said two groups is associated with a level having the finest granularity;
- the method further comprises steps of: receiving user selection of one of said two groups; and redefining said at least two groups into at least two new groups, wherein: the first group of said at least two new groups comprises at least part of the results in the selected group; and the second group of said at least two new groups comprises the remaining results;
- the method further comprises steps of: displaying said at least two new groups using said several levels of granularity, wherein: said first group is associated with a level having the finest granularity; and said second group is associated with one or more levels having coarser granularity, compared with the first group;
- the method further comprises, prior to the step of returning the results, a step of: receiving a user request for the query;
- at the steps of displaying, the results associated with the level of finest granularity are displayed as respective 3D graphical representations related to objects stored on the database;
- at least one unitary 3D graphical representation is used for results associated with a level whose granularity is not the finest granularity;
- said unitary 3D graphical representation has a bubble shape;
- said unitary 3D graphical representation comprises previews of results in the group;
- said previews dynamically react to a user pointer approaching said unitary 3D graphical representation; and
- at the step of displaying, said results are displayed on a visual cue.

The invention further proposes a computer program implementing the method according to the invention. The invention is also directed to a computer system implementing the method of the invention, the system, e.g. a product lifecycle management system, comprising said database and said graphical user interface.

BRIEF DESCRIPTION OF THE DRAWINGS

The foregoing will be apparent from the following more particular description of non-limiting example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 10 shows the same results as in FIG. 9, as redisplayed after a particular group of results has been focused on;

FIG. 12 is an example computer node in the network of FIG. 11 implementing embodiments of the present invention.

DETAILED DESCRIPTION OF THE INVENTION

A description of example embodiments of the invention follows.

The invention proposes a method for navigating in a database of a computer system, wherein all results returned from a database query are displayed using several levels of granularity. The granularity is preferably progressive, which makes it possible to better comprehend how results correlate. Results which are currently prominently displayed on the screen (also called the focus) are associated with the finest granularity. Such results may be, for example, centered in the display screen or placed at the front. The focus (or display focus) is the targeted area in the screen display depending of the current viewpoint. Results far from the focus are given coarse granularity, and possibly dynamically grouped. Accordingly, the results can be represented using a "perspective" constructed from the current user's focus, improving markedly the navigation. In an embodiment, the number of levels of granularity is user-selectable, which still improves the intelligibility of the results.

Figure 1:
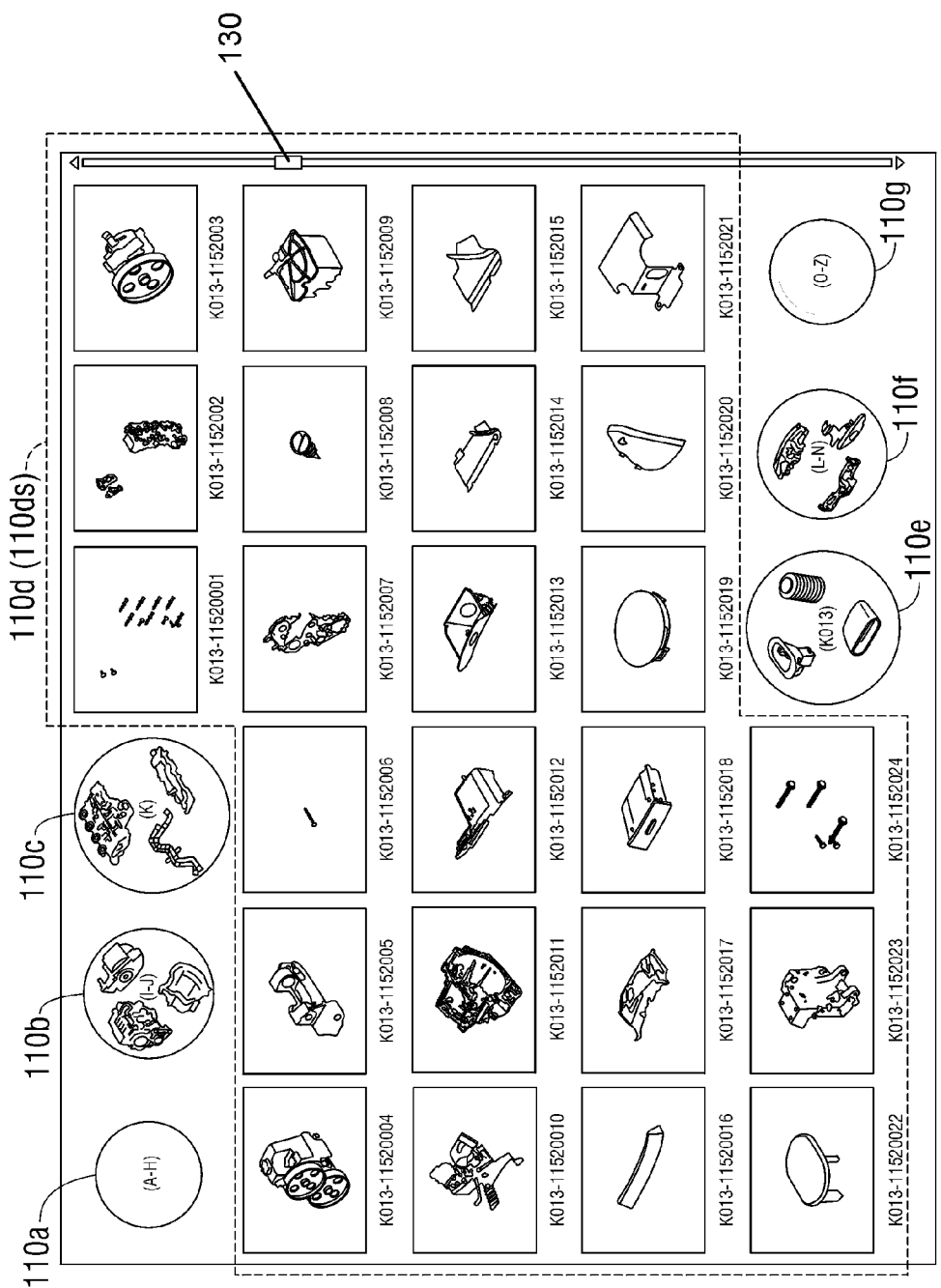
FIGS. 1 and 2 show variants of views wherein results are displayed using several levels of granularity, according to alternative embodiments of the invention.
Figure 2:
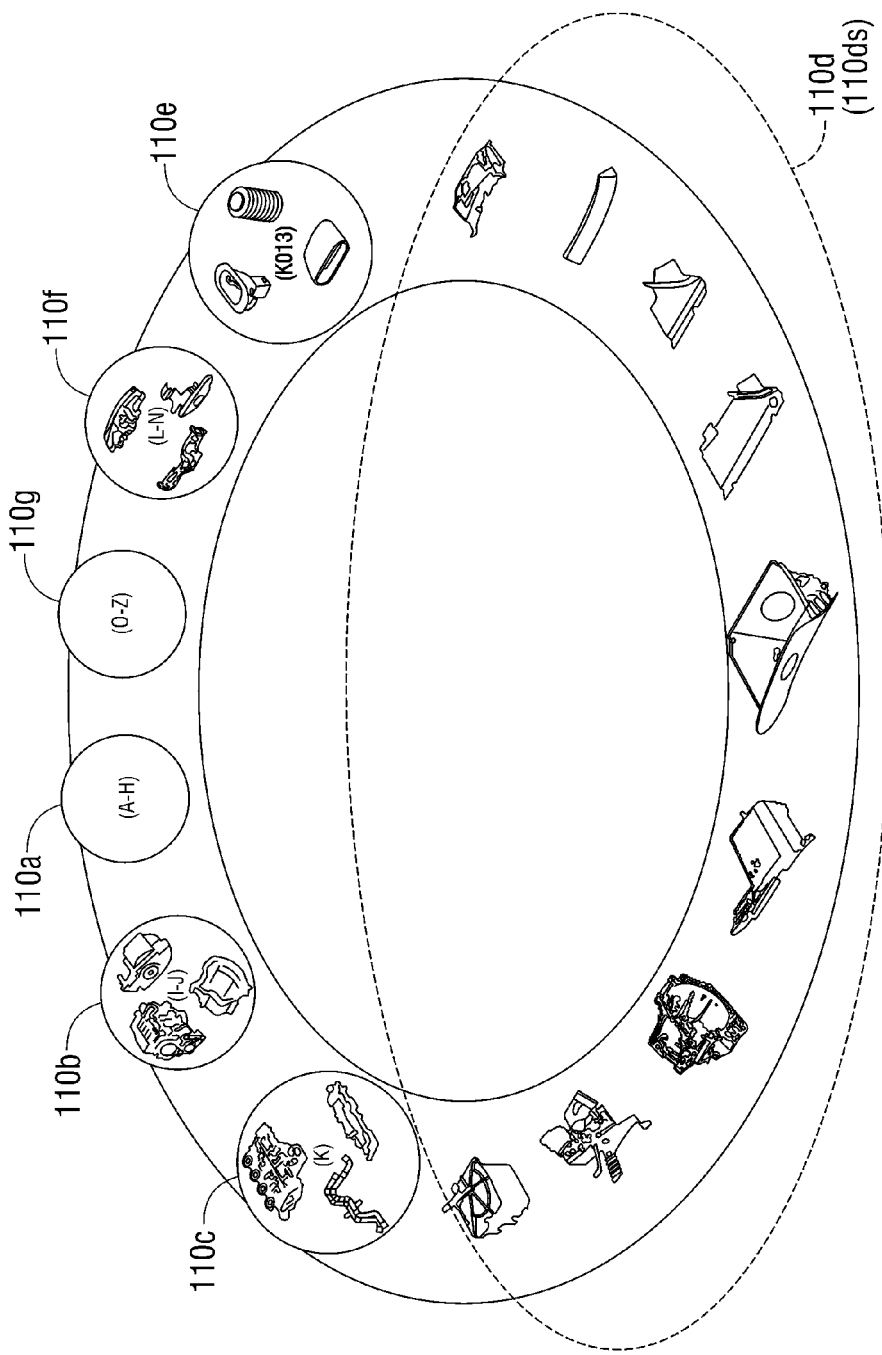

Basic principles underlying the invention will now be discussed in reference to FIGS. 1 and 2. FIGS. 1 and 2 are views of results displayed using several levels of progressive granularity, according to alternative embodiments of the invention.

Querying a database, for instance upon user request, returns results 110*a-g*. As usual in the field of database queries, the results returned are sorted, ordered or ranked, e.g. according to their relevance with respect to the user request.

Sorting is any process of arranging items in some sequence and/or in different sets, and accordingly, it may have two close, yet distinct meanings:

ordering, arranging items of the same kind, class, nature, etc. in some ordered sequence, and categorizing: grouping and labeling items with similar properties together (by sorts).

Notwithstanding these definitions, the returned results may be associated with attributes or ordered according to a sequence reflecting either ordering or category membership.

In the example of FIG. 1 or 2, the results are sorted according to a default sorting rule, for example by name. Tags A-Z in the representations are associated with the results in FIG. 1 or 2, which can denote successive pages of results. For example, all returned results whose name (or reference, designation, header, etc.) begins with letter "a" can be accessed under page A. In a variant, each page A-Z may contain a predetermined number of results, ranked according to the sorting rule.

Said results are displayed in a graphical user interface (or GUI) 100 (details of the GUI will be emphasized later, in reference to FIG. 3). Here the results concern CAD objects, e.g. parts of an engine. The exact nature of the parts displayed in FIG. 1 or 2 is, however, not important for the understanding of the invention.

Importantly, the results 110a-g returned are displayed using several levels, e.g. four, of progressive granularity. The concept of granularity is today well established in the field of computer science, though not accurately defined. In the present specification, "Granularity" is intended to mean the level of detail at which information is viewed or described. For example, the more (or the finer) granular an access tool, the smaller the chunks of information it leads to. As another example, the result of a demographic study may be sorted according to continents, countries, regions, towns, etc. (the fineness of granularity increases when passing from continents to towns). Still another example, an index linking to specific paragraphs is more granular (or has finer granularity) than a table of contents or site map linking to specific pages. In a similar spirit, the granularity is sometimes viewed as the extent to which a larger entity is subdivided e.g., a yard broken into inches has finer granularity than a yard broken into feet.

Each of the sorted results 110a-g displayed are associated with one of said levels of granularity. Making use of different granularities amounts to introduce a notion of groups amongst the results. Yet, a one-to-one mapping between levels of granularity and groups is not mandatory, as will be discussed later. Accordingly, the results displayed are both sorted and (somehow) grouped. Owing to the progressive granularity used, the user can therefore better see how a particular result correlates with remaining results or groups of results. This point shall be exemplified below.

For example, some of the results 110d are associated with the level of finest granularity. Typically, results associated with the finest granularity are e.g. the most relevant results, as displayed just after the query. The display focus is on these objects just after displaying the query results (that is, being the current focus). Basically, in a PLM context, the results 110d associated with the finest granularity are displayed as individual 3D graphical representations of modeled objects stored on the PLM database. Individual 3D graphical representations allow for immediate understanding of the nature of the objects, compared e.g., with object references or names.

Yet, the individual representations may preferably be supplemented by individual object references/names, such as 'K013-1152013" (as in FIG. 1). In a variant, name prefixes only are displayed in relation to groups of coarser granularity.

Preferably, 3D miniature representations may be used, which are distributed on a 2D seamless layout, as in the example of FIG. 1, or on a disk in perspective (or turntable), as in FIG. 2. Seamless representations somehow "derigidify" the navigation and further makes it remain consistent throughout, as will appear below.

In contrast with individual 3D graphical representations, a unitary 3D graphical representation is preferably used for results associated with coarser granularity. Said unitary representation should preferably be representative of a group of results and thus intuitive to the user. To this aim, the unitary representation may for example have a sphere or bubble shape (110a-c, 110e-g).

The various groups of results need not give the same level of details to the user. Accordingly, as can be seen in FIG. 1 or 2, the fineness of the granularity may vary along an underlying ordered sequence. In particular, the granularity may decrease along the sequence, starting from the focus, where the granularity is the finest. Also, the same (finest) granularity may be applied to a given number of results similar in nature to the selected result (e.g. the focus), for example, to part or all the results accessible via the same page as the current focus, e.g. page A. Furthermore, when selecting a page (the focus is thus the page selected) a given number of results (if not all) in that page may be given the same granularity.

Regarding "far" results (110a-c, 110e-g), because groups of results corresponding to bubbles relate to objects which are not either the most relevant or the current focus, a coarser granularity can be applied. Accordingly, the level of detail in the bubbles is less than that available from individual representations, that is, from the finest granularity.

Making use of progressive granularity allows for preventing abrupt transition between individual representations and group representations. In this respect, said unitary 3D graphical representation may comprise previews of results in the group, see e.g. bubbles 100b, c, e, f. Name (or reference, etc.) prefixes may also be displayed in bubbles, see e.g. "(K)" or "(K013)" in bubbles 110c or 110e, in order to make the granularity progressive. Name prefixes can be viewed as a kind of "textual" previews, whose granularity is coarse compared with the entire name.

Thanks to progressive granularity, the user can have a guess of what is hidden in the corresponding groups. Accordingly, progressive granularity makes it possible to better understand how the focused results 110d correlate to remaining results 110a-c, 110e-g. For example, in FIG. 1, the user can easily understand the link between the last result 110d displayed with fine granularity (see the reference K013-1152024) and results grouped in bubble 110e. Namely, the link is the prefix "K013" in this example. Furthermore, the graphical previews establish another type of link. The user can for instance immediately see correlation between results 110d and e.g. 110c or 110e: mechanical parts of an engine are involved.

In a variant, said previews may dynamically react to a user pointer approaching the bubbles. For example, the bubbles may initially display no previews. When the user approaches a pointer, previews may progressively appear in the bubbles, making the GUI more interactive.

When a group of results corresponding to the bubbles contain too many results, previews can for instance be made "adaptive". For example, a selection of the previews can be contemplated, which selection can adapt to the content. For example, only one over ten results or only the first result, or still the first result of each page (see e.g. pages L-N in bubble 110f) may be previewed. Similarly, if textual content were contemplated, keywords or summary could be provided. Thus, the previews might be called adaptive previews in this case.

The views of FIG. 1 or 2 does in fact not reflect the state of display just after the query, but rather reflects a state of display just after a user has focused on a particular result. Indeed, when the results 110a-g are returned from the query, the association of said results with the various levels of granularity is made according to the query. For example, the n most relevant results 110d receives finest granularity, while less relevant results receive coarser granularity.

Rather, the view of FIG. 1 or 2 corresponds to views as displayed once the user has focused on a particular section (here section K013 of page K) or selected a particular result, for example result 110d in said section. Thus, section K013 or the result 110ds ('s' for more than one individual representation 110d of an object) is the current focus. The finest granularity is associated with the current focus. In addition, the same granularity was applied to a given number of results in said section.

Preferably, when redisplaying results are shown in FIGS. 1 and 2, the continuity of the sorting rule (here by pages, denoted by A-Z) is preserved, such that the redisplayed results are still sorted from page A to page Z. This amounts to saying that an underlying ordered sequence of results is preserved. Therefore, the invention proposes a method in which both sorting and grouping the results is possible, but no rigid frontiers are imposed between sorting and grouping when navigating among the returned results.

One may contemplate having e.g., four different levels of granularity, as in FIG. 1 or 2. One may else use only three levels (e.g. by regrouping bubbles 110b and 110c and bubbles 110e and 110f) or only two levels (e.g. by regrouping bubbles 110a-c and 110e-g). The larger the number of the levels, the more progressive the granularity can be made. However, a too large number of levels may be confusing in use. Also, using only two levels may result in abrupt transitions. Therefore, three or four levels seem more convenient.

Advantageously, the number of levels may be interactively modified by the user, so as to add a dimension of navigation; this will be discussed in reference to the next figures.

Interestingly also, a perspective effect could be researched as to the relevance of the results with respect to the current focus. In this respect, "Far away" groups e.g. 110a and 110g may appear smaller than "closer" ones (110c and 110e) and previews may be made available only on "closer" groups. Note that the concept of far/close depends on (is relative to) the current focus, but initial sorting is preserved.

More specifically, in reference to FIG. 1, a slider 130 may be provided (in a 2D layout) as part of the widgets of the GUI, enabling scrolling of the results. Accordingly, when scrolling the results, individual representations 110d of objects sequentially appears at one end (near one of the closest groups, precedes) and disappear at the other end (near the other of the closest groups, succeeds), except when reaching the end of the result (according to the sorting rule), where a side effect may lead to unblock the last group, e.g. the group 110g. Note that a dynamic resegmentation of the groups occurs when scrolling the results.

In the following, embodiments of the invention will be described which relate more particularly to a PLM context.

As an example embodiment, the process of the invention is implemented in a computer network comprising user computers and one or more product data management (PDM) system. The user computers are in communication with the PDM system. The PDM system may, for example, be located at a backbone of the network. The PDM system allows for the management of numerous documents, relations, and data, possibly hierarchically interrelated. Such a PDM system is equipped with a product lifecycle database having data related to modeled products, assemblies, and product parts, which are likely to be searched and possibly subsequently edited by a designer. A plurality of users may thus work in a collaborative way, on different parts, products or assemblies.

Figure 3:
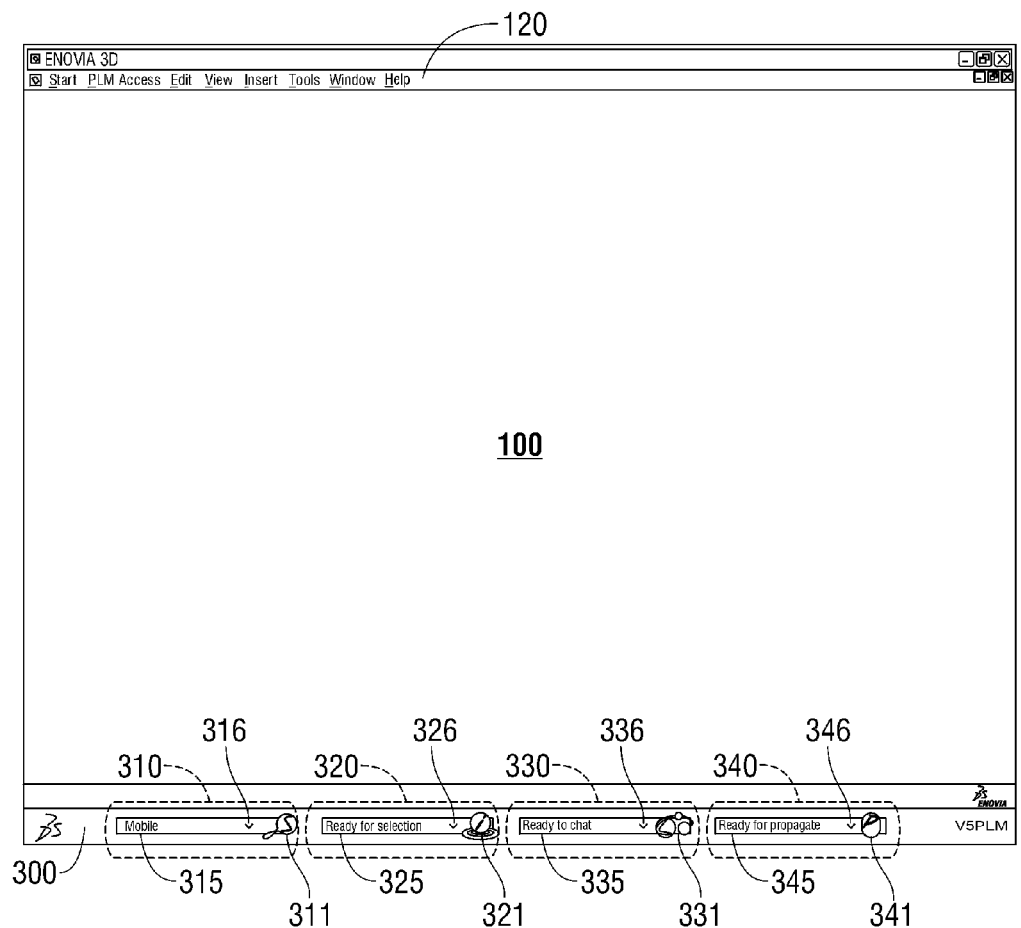
FIG. 3 is an exemplified display of a PLM graphical user interface showing a toolbar for querying a database, according to an embodiment of the invention.

In FIG. 3, the GUI 100 may be a typical PLM-like interface, having standard menu bars 120, as usual in the art. The GUI 100 is run on a computer on a network, having a display and memory. For instance, GUIs similar to that identified by reference numeral 100 illustrated in FIG. 3 may be run on other computers of the network. These computers may further benefit from similar local applications and a common environment.

The GUI 100 is adapted for allowing access to the product lifecycle database, either on a user's request or as a background task. Designers may hence query the PLM database directly using said GUI 100. The search may for instance be triggered via the toolbar 300. Here, search results are displayed, as no query has yet been triggered.

More in details, the toolbar 300 may comprise one or more toolbar areas. In the embodiment of FIG. 3, the toolbar 300 comprises four such toolbar areas 310, 320, 330, 340. Each area of the toolbar is associated with one or more functions or tasks, which are likely to be selected by a user. Such functions are directly or indirectly initiated via selection of the associated area.

Each of the four toolbar areas of FIG. 3 shows preferably a button 315, 325, 335, 345, suitable for user-selection of a function to be performed. The buttons may be indicative of the function, e.g. "Ready for selection". In addition, each of the buttons 315, 325, 335, 345 of the toolbar areas 310, 320, 330, 340 may be supplemented by pull-down menu buttons (respectively denoted by reference numbers 316, 326, 336, 346) for displaying more functions or possible arguments thereof.

In the embodiment of FIG. 3, a first toolbar area 310 may generally be associated with search operations. A second area 320 may concern selection operations and a third area 330 be directed to operations of collaboration in a collaborative workgroup, for instance like chat/communication with other designers. Said collaborative workgroup may, for example, be composed of people sharing a collaborative workspace such as co-designers and project supervisors. A fourth toolbar area 340 may be associated with modifications delivery functions for updating the database and inform the collaborative workgroup.

The above structure allow for an efficient access to routine PLM tasks. In particular, the third toolbar area 330, dedicated to collaborative work, may help the designer to quickly contact other designer and thereby solve conflicts inherent to collaborative work in network.

In operation, a user may select the input field 315, 325, 335, 345 for instance thanks to the user's mouse, may directly enter or select a desired argument (for example the keyword "Mobile" in the input field 315 of the "search" area 310). Once the argument has been selected, the user may click an associated icon button 311, 321, 331, 341 in order to trigger the execution of the function (here a search function is triggered by clicking icon 311). Such icon buttons 311, 321, 331, 341 have advantages in terms of ergonomics. Such buttons may further be tagged with intuitive icons. In the same spirit, the fields of the toolbar may be configured so as to display "positive" clearer messages, so as to optimize user guidance.

Figure 4:
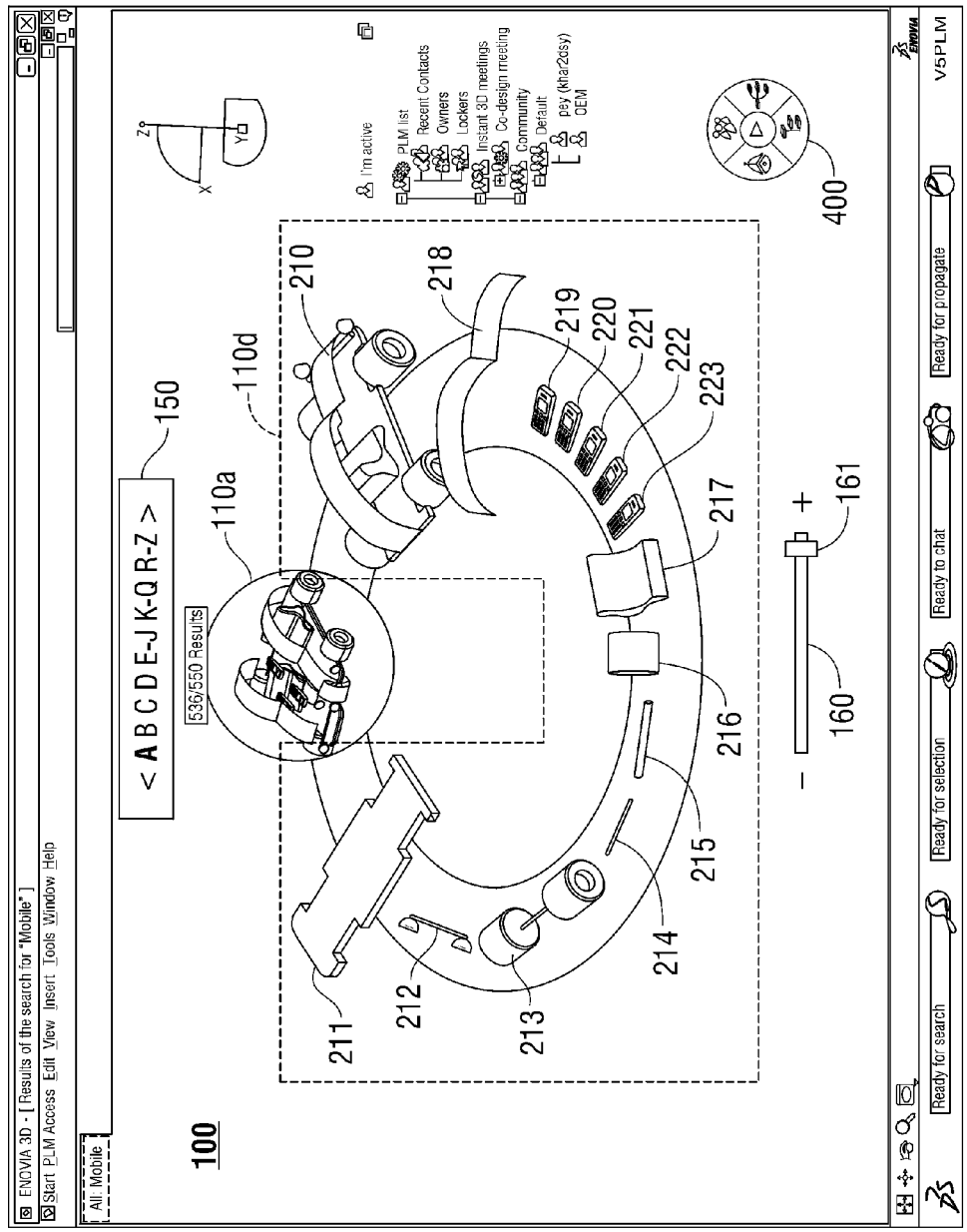
FIG. 4 shows a view in the PLM graphical user interface of FIG. 3, wherein results are displayed using several levels of granularity.

A possible result of the query "Mobile" is represented in FIG. 4, showing results returned in response to the query. As in FIG. 1 or 2, the results 110a and 110d are displayed using different levels of granularity. The user gets the results on a disk or turntable, wherein a bubble 110a acts as a "data bag". Again, a default sorting rule is applied. Here the results are sorted by name.

In this non-limiting example, it is assumed that the database contains notably two classes of products related to the keyword "Mobile", that is: mobile phones (denoted by both the generic reference 110d and references 219-223) and a modeled miniature car (110d and 210).

By default, the algorithm provides that results pertaining to page A are displayed using the finest granularity. The objects 110d thus form a default group of most relevant results returned, whose name begins with letter "a". The generic name of the mobile phone may be e.g. "Advance mobile phone", the name of the car be "Amusement mobile", hence the results returned. Other results are displayed using coarser granularity.

The algorithm may be designed to ensure that a default number, e.g. 14 of relevant parts/objects are displayed using the finest granularity and that remaining objects 110a are grouped according to coarser granularity. Here only one such group 110a is represented. However, the default number of groups of remaining objects may be user-modifiable, as previously evoked.

Regarding the mobile phones 219-223, various color versions are displayed. Concerning the miniature car, parts 211-218 (e.g. the chassis frame 211) are also returned and displayed, as being logically related to the input keyword "Mobile".

Other results 110a benefit from a coarser granularity, that is, are grouped and represented as a bubble 110a, possibly showing previews of said remaining objects, as in FIG. 1 or 2. In the example of FIG. 4, the bubble 110a shows aggregated previews of mobile phones 219-223 and the miniature car 210. An indication of an approximate number of such remaining objects may additionally be provided (not shown).

Next, a first widget 150 may be provided which indicates the current group (here corresponding to page A) being viewed with the finest granularity. Note that a group does not necessarily correspond to a page; in particular, groups of results having coarser granularity may in fact aggregate several pages.

In use, the user can explore the results pages by page by clicking symbols ">" or "<" in the widget 150. He/she may also go directly to a next page of the results using the selectable range display which depends on the sorting rule (here A, B, C, D, E-J, K-Q, R-Z). When going to another page, e.g. page B, said page would be expanded to fine granularity while a group would be formed to aggregate pages A, C-Z and possibly some of the results in page B which cannot be displayed on the turntable.

In addition, another widget 160 or "zoom" slider (interface component generally) may be provided which acts as a zoom, notably for varying the number of displayed levels of granularity. In this example, the cursor 161 has three possible locations: right, middle, left. When the cursor 161 of the widget 160 is on the right, only one group 110a with coarse granularity is displayed. The number of exploded results (with finest granularity) is therefore optimal.

A last graphical tool 400 can be provided for adding possibilities of navigation. This will be explained in reference to FIGS. 8-9.

Figure 5:
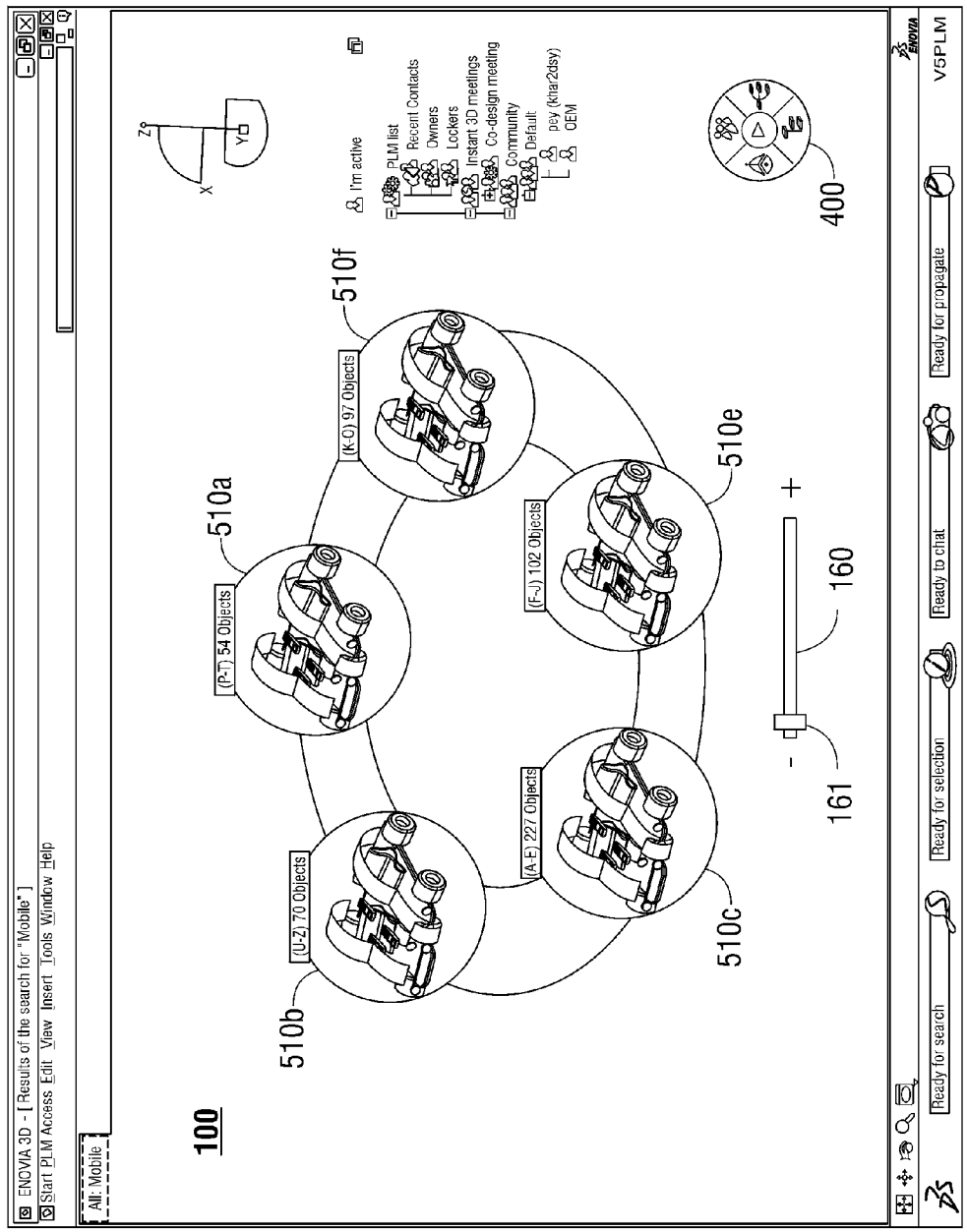
FIG. 5 shows the same results as in FIG. 4, as redisplayed after a change in the granularity of the results.

In reference to FIG. 5: using the "zoom" slider 160, the user has modified the granularity of the results. Here, zooming out (left position) has reduced the number of levels to one level of (coarse) granularity only. The results grouped by the name criterion. Meanwhile, the algorithm has created new groups 510a-c, 510e-f, in order to optimize the segmentation. Accordingly, the groups have been redefined compared with the situation of FIG. 4. To achieve this, various philosophies might be adopted.

Figure 6:
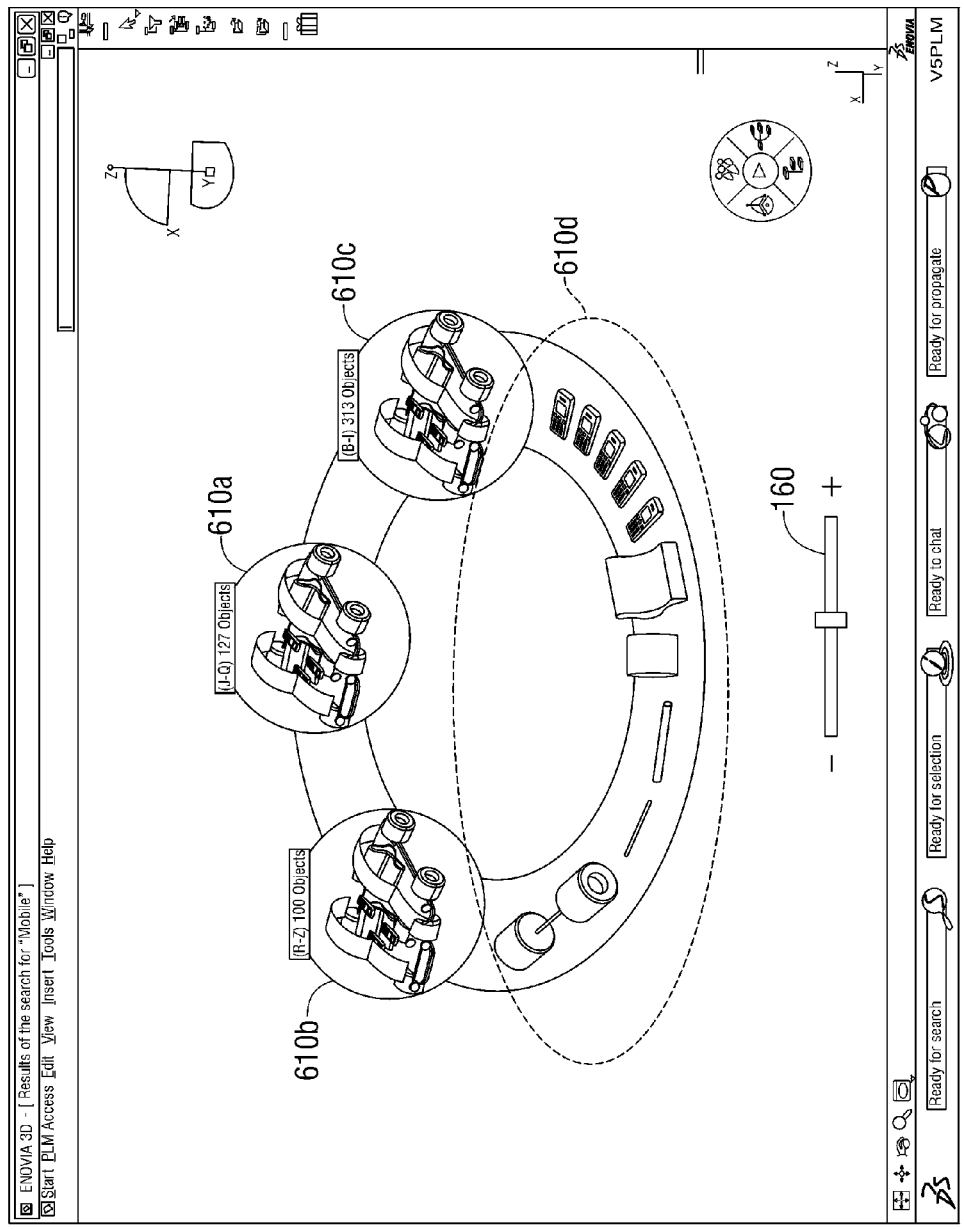
FIG. 6 shows the same results as in FIG. 4, as redisplayed after another change in the granularity of the results.

For example, the algorithm may systematically try to create a given number of homogeneous groups, depending on the position of the cursor 161 of the slider 160 (for example:

five groups 510a-c, 510e-f, when the cursor 161 is in zoom-out/left position (having coarse granularity only);

four groups when the cursor 161 is at the middle (including one group having the finest granularity, the other groups receiving coarse granularity, see groups 610a-d in FIG. 6); and two groups when the cursor 161 is in zoom-in or right position (including the finest granularity group, the other group being of coarse granularity, see 110a and 110d in FIG. 4).

Accordingly, using the zoom slider 160 to modify the granularity of the results may also result in automatically redefining (e.g. resegmenting) groups of results.

In reference to FIG. 6, using the zoom slider 160, the user has again modified the granularity of the results. Here the total number of levels of granularity remains unchanged compared with the situation in FIG. 4. However, the number of groups 610a-c having a coarse granularity has increased. Hence the overall granularity including all the groups has changed.

Therefore, the zoom slider 160 allows the user to change the number of levels of granularity and the definition of groups within a same level. The groups are therefore, not anymore rigid sets, with rigid frontiers. In contrast, the invention may provide, in an embodiment, optimizing the number of groups and their content according to both sorting rules and required number of levels of granularity.

Next, the user may decide to focus on an object contained in one of the groups, e.g. 610a (corresponding to pages J-Q). In this respect, he/she might double-click said group, resulting in the display shown in FIG. 7.

Figure 7:
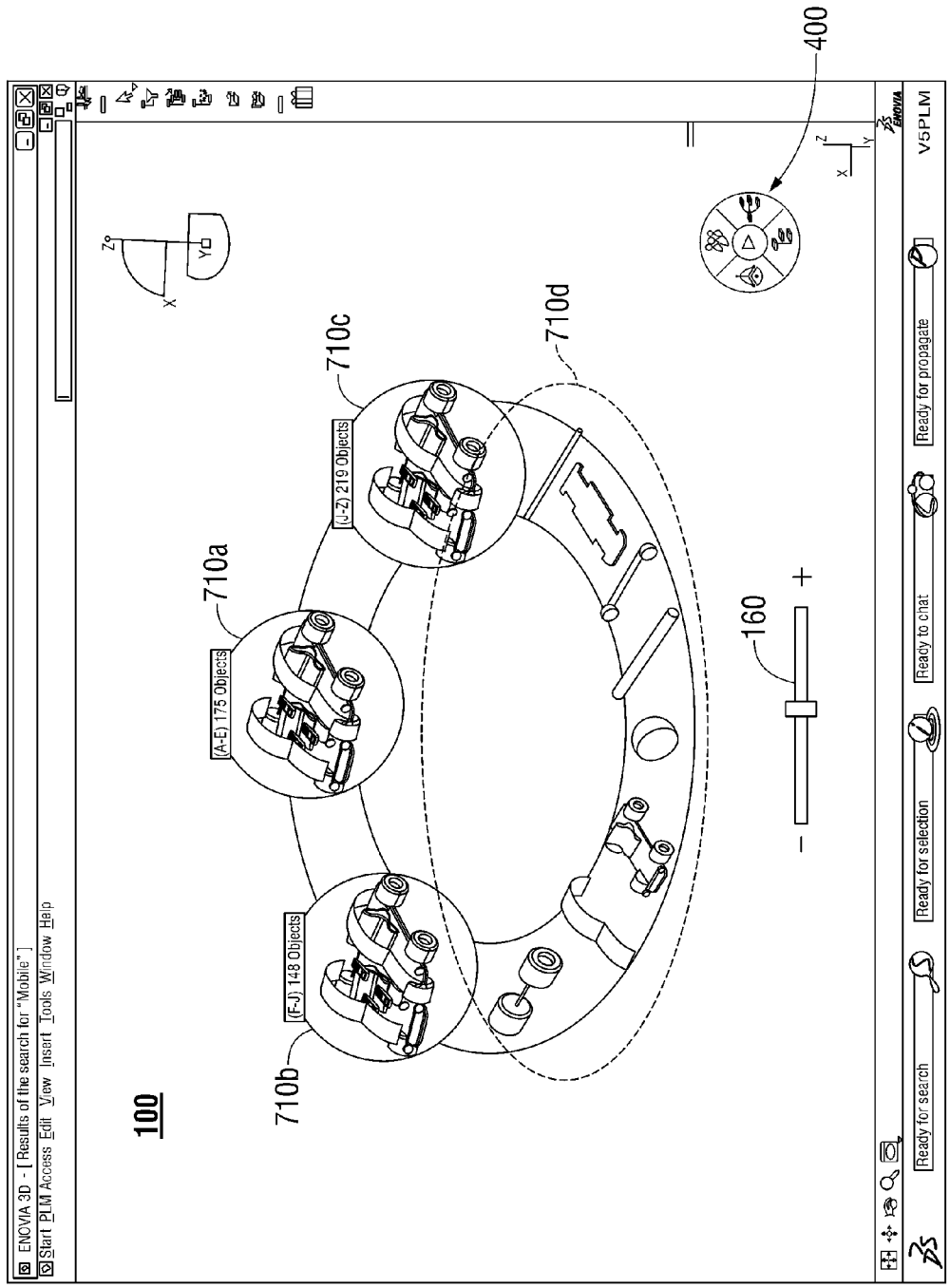
FIG. 7 shows the same results as in FIG. 6, as redisplayed after receiving focus on a particular result.

In reference to FIG. 7, the turntable has "rotated" compared with FIG. 6. A given number of objects of page J now forms the group 710d having the finest granularity. Said objects are thus displayed as unitary objects, having a respective 3D graphical representation. Said objects are further now the closest to the viewpoint (modification of the focus) and other groups 710a-c have been dynamically redefined (with respect to FIG. 6), and redistributed on the turntable. Here the position of the cursor of widget 160 remains unchanged compared with FIG. 6. Note the current focus is the closest from the viewpoint, whereas "farther" results are recast at the background on the turntable. Groups 710a-c in FIG. 7 are different than those in FIG. 6 because they contain a different number of objects, and different objects.

In an embodiment, the turntable can be actuated in a similar fashion as the 2D layout of FIG. 1. Here, instead of using a slider (e.g. the slider 130) as in FIG. 1, the user may turn the turntable thanks to its pointer, which makes it possible to scroll results. As in the case of FIG. 1, individual representations of objects (finer granularity) sequentially appear at the front of the turntable, as extracted from one of the closest groups, and disappear in the other of the closest groups. In contrast with FIG. 1, no side effect occurs, owing to the turntable design. Again, a dynamic resegmentation of the groups occurs when scrolling the results.

Thus, as a summary, the method of navigation according to the invention allows for defining a subset of objects stored in a database (e.g. the subset formed by objects 710*a-d* or, equivalently, 610*a-d* in FIG. 6, returned from the query) and at least two groups within the subset. A first group (610*a*, 610*b* or 610*c*) aggregates, for example, the least relevant results and will be associated with a coarse granularity. The second group (e.g. 610*d*) contains objects to be associated with the finest granularity. Next, the method provides for displaying in the GUI the first and second groups with respective granularities. As described above, at least one unitary graphical representation may correspond to the first group (e.g. a bubble) while individual graphical representations of each of the objects corresponding to the second group will be displayed. Then, the method further allows for dynamically redefining said at least one group (e.g. 610*a*) by varying therein a number of objects upon receiving instructions of a user for navigating among the displayed objects in the groups. Different levels of granularity are thus involved, making it possible for a user to focus on given results (e.g. 710*d*) while still viewing the remaining results (e.g. 710*a-c*). The progression in the navigation is thereby improved. In addition, when the user changes the required granularity, new groups might be formed, facilitating the comprehension of the relations between the objects.

Figure 8:
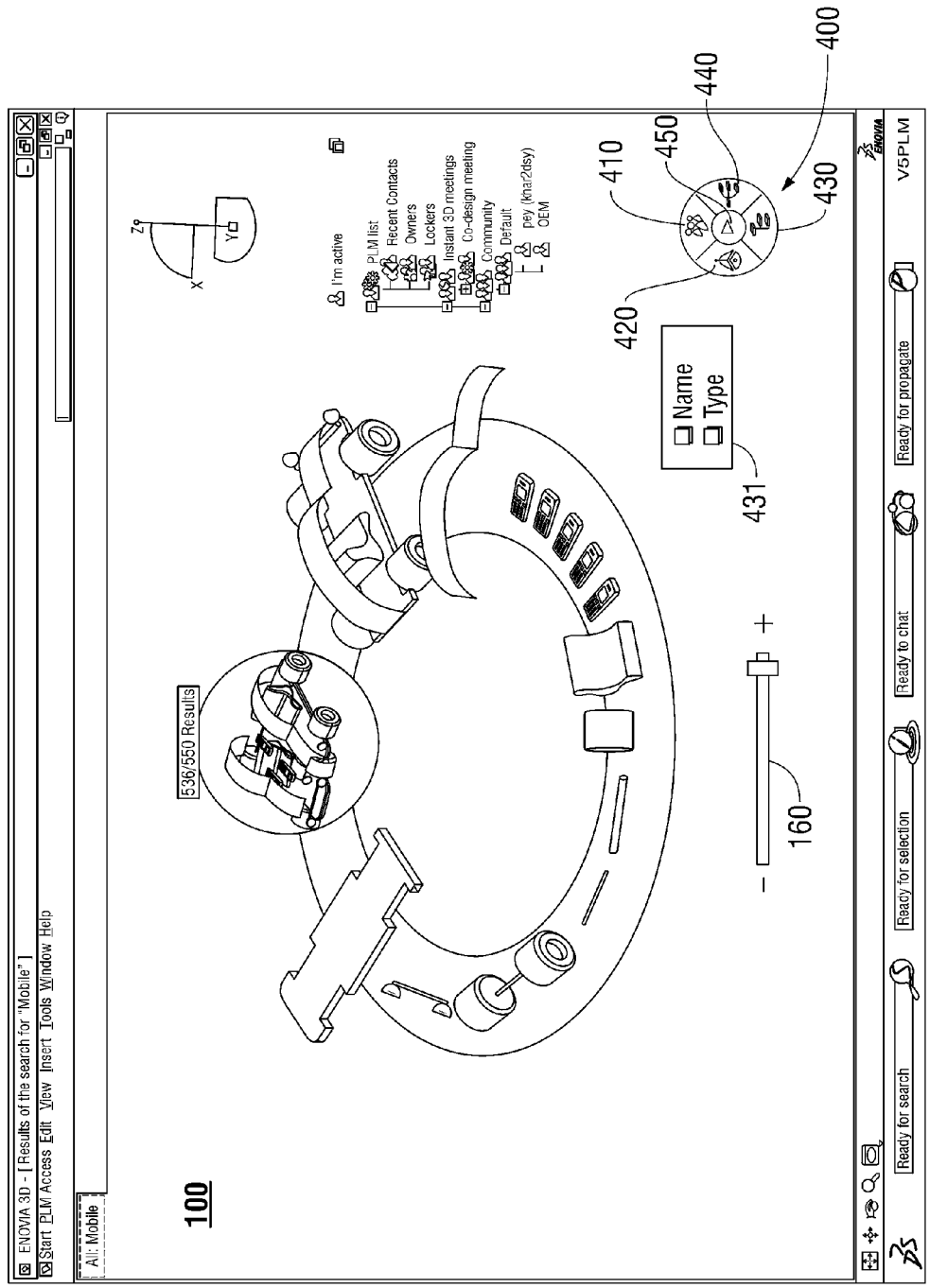
FIG. 8 shows the same results as in FIG. 6, wherein a functionality of a graphical tool is activated in view of a further navigation step.

FIG. 8 shows the same view as in FIG. 6, wherein a functionality of a graphical tool 400 has been activated, for allowing navigation according to criteria. In other words, said tool may, in an embodiment, trigger a process for displaying the results of e.g. FIG. 6, which results are redistributed (possibly reordered or categorized) according to a new criterion. Said process is hereafter referred to as a redistribution process.

As shown in FIG. 8, the graphical tool 400 may comprise user-interactive areas 410 (North quadrant), 420 (West), 430 (South), 440 (East), 450 (centre), which may for instance be activated by a simple mouse click. The areas of the graphical tool 400 are preferably tagged with markers for easier identification and arranged so as to make the graphical tool 400 intuitive and ergonomic. In the example of FIG. 8, the graphical tool 400 has the general shape of a compass (areas 410, 420, 430, 440 arranged in quadrants), so that it will be hereafter denoted either by "compass" or "graphical tool" to mean the same thing. Though such a shape is preferred with respect to its handiness, various other shapes could be provided. Preferably, the compass 400 of the system is intended to be a user-friendly and intuitive tool.

The user-selectable areas 410-450 may be dedicated to various types of functions. In this respect quadrant 430 may be activated, which results in displaying a sub-menu 431. The sub-menu 431 offers the user to choose among navigation by Name or Type. Choosing the "Type" criterion will result in the view of FIG. 9.

Figure 9:
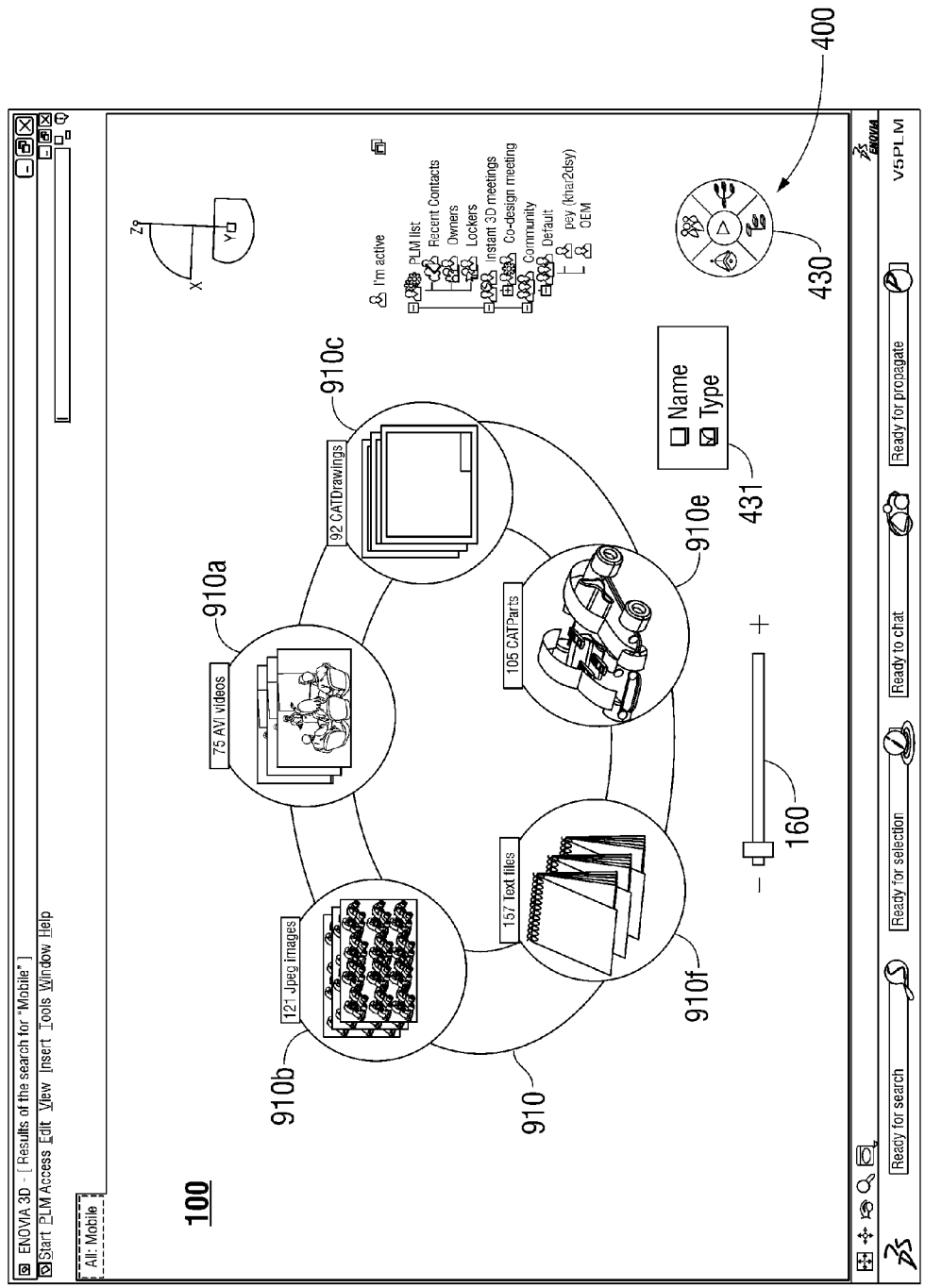
FIG. 9 shows a view of new results as obtained after said new navigation step.

FIG. 9 shows a view of new results as obtained after a new navigation step based on the chosen criterion, that is, redisplayed on the turntable 910 according to types of objects. In the present example, it has been identified five types of files (which files relate to the previous objects). Accordingly, five groups 910*a, b, c, d, e, f* have been formed, reflecting said five types of files. Said types of files are videos 910*a*, Jpeg images 910*b*, Text files 910*f* CAD objects/parts 910*e* and CAD drawings 910*c*, as indicated in tags displayed in the vicinity of the represented groups.

The cursor of widget 160 has in this example automatically been set to the left position, that is, only one level of granularity (coarse) has been maintained. Such an option might be the default one when a large number of files is involved.

The underlying principle of the redistribution by types is explained now.

Recall that the database comprises modeled objects and relations between said modeled objects. Said modeled objects are associated to a set of values of attributes, whose values are stored on the database or computable based on relations involving said modeled objects.

Said redistribution process may first comprise displaying to the user a view of the results (according to the method of the invention, see e.g. FIG. 6). Then, the redistribution process may comprises receiving a selection by a user of an attribute type, which can typically be achieved via the graphical tool 400, as will be explained. Next, said redistribution process comprises steps of:
- querying the database for the objects of the previously displayed view;
- providing one or more values of the selected attribute type, associated to the objects of the previous view; and
- redisplaying said objects in the view according to the new provided values of the attribute.

Said attribute types may for instance correspond to criteria (for example, object names or types). It is therefore possible to navigate among the results according to criteria instead of pages.

Note that instead of a graphical tool, such as the graphic tool 400, the same redistribution process could be triggered using any icon or menu command or other user command.

Next, a user may wish to expand results pertaining to a particular group of results, e.g., group 910*e*. To this aim, the user may double-click the corresponding bubble 910*e*, resulting in the view of FIG. 10, in an embodiment of the invention.

Figure 10:
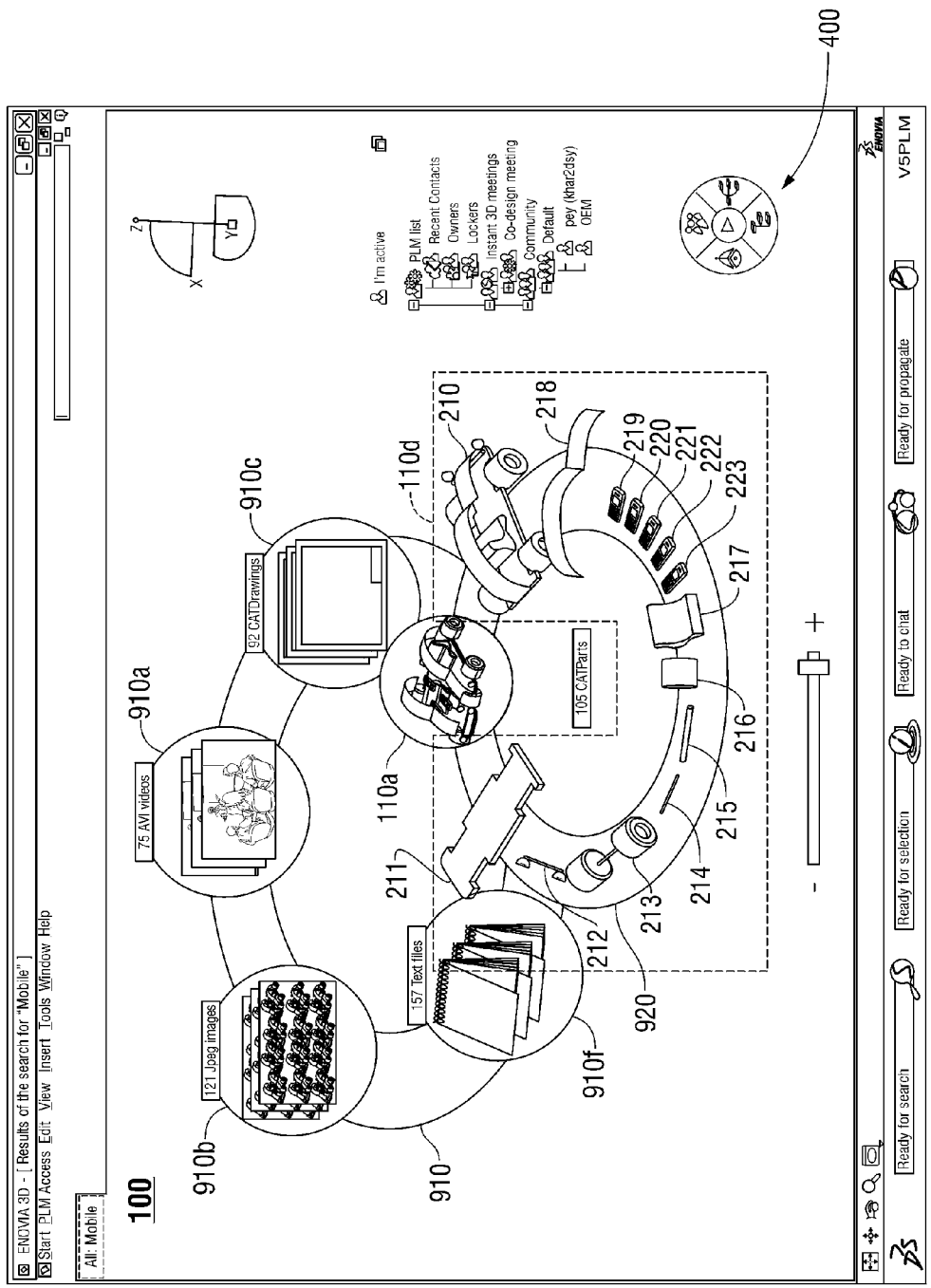

FIG. 10 shows the same results as in FIG. 9, wherein a particular group (the group 910*e* of CAD objects/parts in FIG. 9) of results has received focus of a user. The user gets all the requested objects on a second-order turntable 920 (the turntable 910 being the parent or first-order turntable). As a result, the user gets the same objects 110*a*, 110*d*, 210-223 as displayed in FIG. 4.

In a variant, this expansion may occur only when a single level of (coarse) granularity or when groups (e.g., groups 910*a, b, c, d*, e, f in FIG. 9) only are present in the first turntable 910.

In another variant, the displayed objects (including bubbles) 910*a, b, c, d, e, f*, 110*a*, 110*d*, 210-223 are distributed according to a respective weight at a given level in the turn-table hierarchy (the first-order 910, the second-order 920, etc.), and the weight of a displayed object depends on the number of descendants of said object in the hierarchy which are displayed in the GUI 100. Thanks to the principle of the weight dependence, such a solution allows the user to better comprehend its progression through the organized data as well as the relations between objects and this, in an easy and intuitive way.

Figure 11:
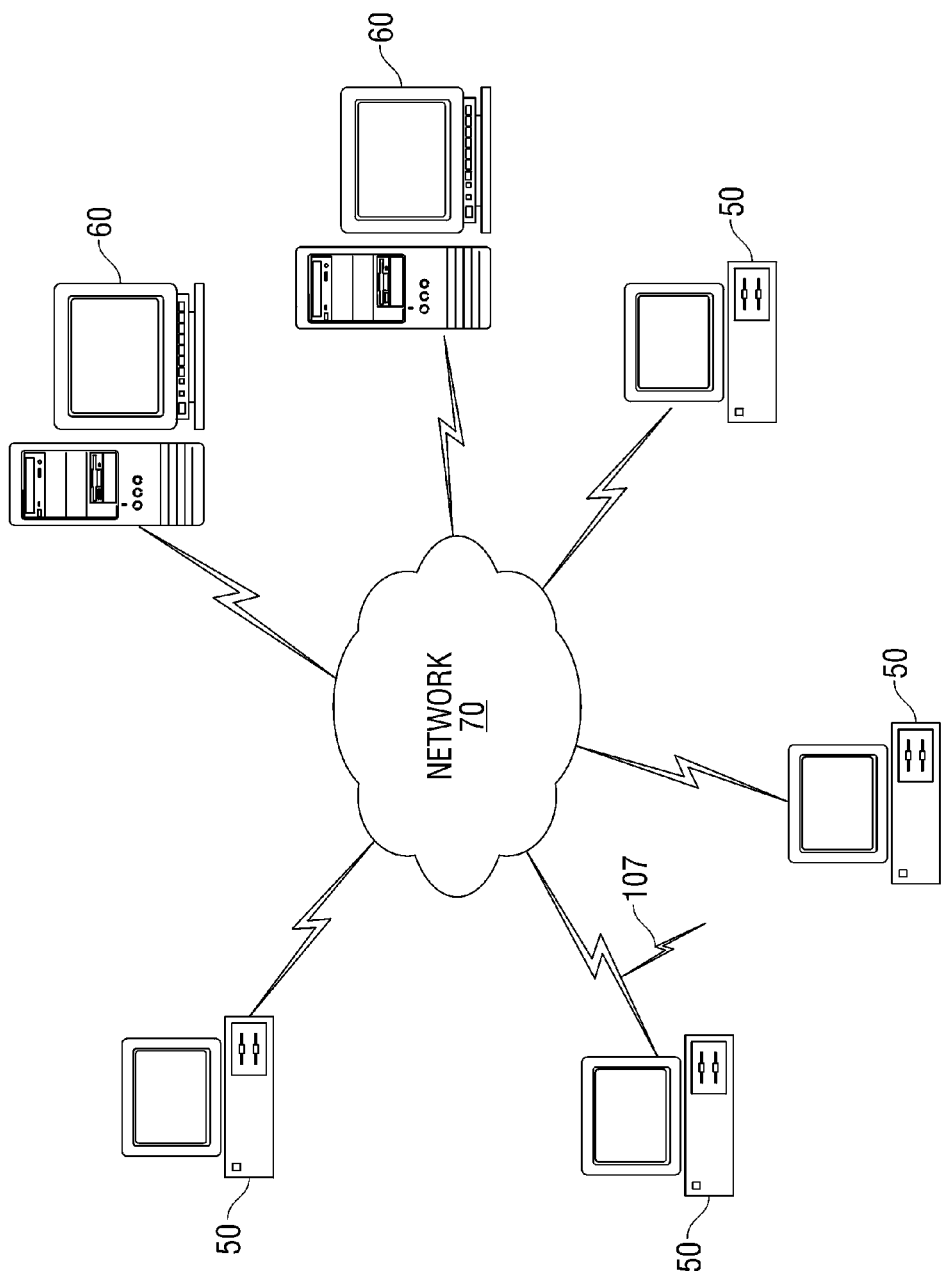
FIG. 11 is an example computer network deploying embodiments of the present invention.

FIG. 11 illustrates a computer network or similar digital processing environment in which embodiments of the present invention may be deployed.

Client computer(s)/devices 50 (e.g., the user computer described in reference to FIG. 3) and server computer(s) 60 (e.g., the product data management (PDM) system described in reference to FIG. 3) provide processing, storage (e.g., the product lifecycle database described in reference to FIG. 3), and input/output devices executing application programs and the like. Client computer(s)/devices 50 can also be linked through communications network 70 to other computing devices, including other client devices/processes 50 and server computer(s) 60.

Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 12 is a block diagram of the internal structure of a computer (e.g., client processor/device 50 or server computers 60) of FIG. 11 in which various embodiments of the present invention may be implemented. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 11). Memory 90 provides volatile storage for computer software instructions 92 and data 94 used to implement an embodiment of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 11 and 12 are for purposes of illustration and not limitation of the present invention.

While this invention has been particularly shown and described with references to example embodiments thereof it will be understood by those skilled in the art that various changes in form and details may be made therein without departing from the scope of the invention encompassed by the appended claims.

What is claimed is:

1. A method for navigating in a database of a computer product data management (PDM) system, the computer system comprising a graphical user interface, the method comprising steps of:

returning results from a query in a product lifecycle management (PLM) database having data related to modeled products, assemblies and product parts; and displaying simultaneously at the graphical user interface after the query and on a single view, all the results returned using several levels of progressive granularity such that, at one time, different ones of the results being displayable at respective different levels of granularity, each of the results being associated with one of the levels, according to the query, the results being thereby simultaneously displayed with different levels of details, wherein most relevant results are displayed with the finest granularity while, simultaneously, less relevant results are displayed with coarser granularity, wherein the step of displaying includes displaying the results associated with the level of finest granularity as respective 3D graphical representations of the related modeled products, assemblies and product parts, wherein at least one unitary 3D graphical representation is used for results associated with a level whose granularity is not the finest granularity, wherein the unitary 3D graphical representation comprises previews of results of the related modeled products, assemblies and product parts in the group, wherein the results returned are sorted in an ordered sequence, and, at the step of displaying, at least two groups of results are defined based on the ordered sequence and displayed, wherein one of said two groups is associated with a level having the finest granularity;

the method further comprising steps of:
receiving user selection of one of said two groups;
redefining said at least two groups into at least two new groups, wherein:
 the first group of said at least two new groups comprises at least part of the results in the selected group; and
 the second group of said at least two new groups comprises the remaining results;

the method further comprising steps of:
displaying said at least two new groups using said several levels of granularity, wherein:
 said first group is associated with a level having the finest granularity; and
 said second group is associated with one or more levels having coarser granularity, compared with the first group.

2. The method according to claim 1, further comprising steps of:
   receiving a user selection of at least one of the results returned; and
   redisplaying the results using the several levels of granularity, the selected result is associated with a level having the finest granularity.

3. The method according to claim 1, further comprising steps of:
   receiving a user request for modifying the number of levels of granularity; and
   redisplaying the results according to the modified number of levels.

4. The method according to claim 3, wherein, at the step of receiving the user request for modifying the number of levels of granularity, the number can be selected amongst 1 and 2.

5. The method according to claim 3, wherein the graphical user interface comprises a widget or interface component adapted for triggering a modification of the number of levels.

6. The method according to claim 1, wherein:
   the step of redisplaying the results includes decreasing the fineness of the granularity in the levels from the selected result along the ordered sequence.

7. The method according to claim 1, further comprising a step of receiving a user request for the query.

8. The method according to claim 1, wherein, the step of displaying includes displaying the results associated with the level of finest granularity as respective 3D graphical representations related to objects stored in the database.

9. The method according to claim 8, wherein at least one unitary 3D graphical representation is used for results associated with a level whose granularity is not the finest granularity.

10. The method according to claim 9, wherein the unitary 3D graphical representation has a bubble shape.

11. The method according to claim 9 wherein the unitary 3D graphical representation comprises previews of results in the group.

12. The method according to claim 11, wherein the previews dynamically react to a user pointer approaching the unitary 3D graphical representation.

13. The method according to claim 1, wherein at the step of displaying, the results are displayed on a visual cue.

14. A computer program product comprising a non-transitory computer readable medium including a computer readable program for navigating in a database of a computer product data management (PDM) system, wherein the computer readable program when executed on a computer causes the computer to:
   return results from a query in a product lifecycle management (PLM) database having data related to modeled products, assemblies and product parts; and
   display simultaneously at a graphical user interface after the query and on a single view, all the results returned using several levels of progressive granularity such that, at one time, different ones of the results being displayable at respective different levels of granularity, each of the results being associated with one of the levels, according to the query, the results being thereby simultaneously displayed with different levels of details, wherein most relevant results are displayed with the finest granularity while, simultaneously, less relevant results are displayed with coarser granularity, wherein the step of displaying includes displaying the results associated with the level of finest granularity as respective 3D graphical representations of the related modeled products, assemblies and product parts, wherein at least one unitary 3D graphical representation is used for results associated with a level whose granularity is not the finest granularity, wherein the unitary 3D graphical representation comprises previews of results of the related modeled products, assemblies and product parts in the group, wherein, the results returned are sorted in an ordered sequence, and, at the step of displaying, at least two groups of results are defined based on the ordered sequence and displayed, wherein one of said two groups is associated with a level having the finest granularity;
   the method further comprising steps of:
   receiving user selection of one of said two groups;
   redefining said at least two groups into at least two new groups, wherein:
      the first group of said at least two new groups comprises at least part of the results in the selected group; and
      the second group of said at least two new groups comprises the remaining results;
   the method further comprising steps of:
   displaying said at least two new groups using said several levels of granularity, wherein:
      said first group is associated with a level having the finest granularity; and
      said second group is associated with one or more levels having coarser granularity, compared with the first group.

15. The computer program product of claim 14, wherein the computer readable program further causes any combination of:
   receiving a user request for modifying the number of levels of granularity; and
   redisplaying the results according to the modified number of levels, wherein at least one unitary 3D graphical representation is used for results associated with a level whose granularity is not the finest granularity.

16. A computer system comprising:
   a computer having:
   database means having data related to modeled products, assemblies and product parts;
   a graphical user interface; and
   a navigation means coupled to the database means for:
      returning results from a query in the database means; and
      displaying simultaneously at the graphical user interface, after the query and on a single view, all the results returned using several levels of progressive granularity such that, at one time, different one of the results being displayable at respective different levels of granularity, each of the results being associated with one of the levels, according to the query, the results being thereby simultaneously displayed with different levels of details, wherein most relevant results are displayed with the finest granularity while, simultaneously, less relevant results are displayed with coarser granularity, wherein the step of displaying includes displaying the results associated with the level of finest granularity as respective 3D graphical representations of the related modeled products, assemblies and product parts, wherein at least one unitary 3D graphical representation is used for results associated with a level whose granularity is not the finest granularity, wherein the unitary 3D graphical representation comprises previews of results of the related modeled products, assemblies and product parts in the group, wherein, the results returned are sorted in an ordered sequence, and, at the step of displaying, at least two groups of results are defined based on the ordered sequence and displayed, wherein one of said two groups is associated with a level having the finest granularity;

the method further comprising steps of:

receiving user selection of one of said two groups;

redefining said at least two groups into at least two new groups, wherein:

the first group of said at least two new groups comprises at least part of the results in the selected group; and the second group of said at least two new groups comprises the remaining results;

the method further comprising steps of:

displaying said at least two new groups using said several levels of granularity, wherein:

said first group is associated with a level having the finest granularity; and said second group is associated with one or more levels having coarser granularity, compared with the first group.

17. A computer system as claimed in claim 16 wherein the navigation means further:

receiving a user selection of at least one of the results returned; and redisplaying the results using the several levels of granularity, the selected result is associated with a level having the finest granularity.

18. A computer system as claimed in claim 16 wherein the navigation means further:

receiving a user request for modifying the number of levels of granularity; and redisplaying the results according to the modified number of levels.

19. The computer system of claim 16, wherein the computer system is a product lifecycle management system.

\* \* \* \* \*